United States Patent [19]

Gueguen et al.

[11] Patent Number: 4,497,458
[45] Date of Patent: Feb. 5, 1985

[54] WINDER FOR A SAFETY BELT HAVING A RAPID LOCKING AND UNLOCKING ACTION AND A REDUCED OPERATING NOISE

[75] Inventors: Daniel Gueguen, Montesson; Jacques Rothera, Saint Michel sur Orge, both of France

[73] Assignee: Autoliv AB, Vargarda, France

[21] Appl. No.: 475,662

[22] Filed: Mar. 15, 1983

[30] Foreign Application Priority Data

Mar. 18, 1982 [FR] France ................. 82 04584

[51] Int. Cl.³ .............. A62B 35/02; B65H 75/48
[52] U.S. Cl. ................................. 242/107.4 B
[58] Field of Search ............. 242/107.4 R–107.4 E; 280/806, 807; 297/475–478

[56] References Cited

U.S. PATENT DOCUMENTS 3,831,878 8/1974 Griffin .................. 242/107.4 A
4,253,621 3/1981 Seel ....................... 242/107.4 A

FOREIGN PATENT DOCUMENTS 2454310 12/1980 France ..................... 242/107.4 B Primary Examiner—John M. Jillions
Attorney, Agent, or Firm—Sughrue, Mion, Zinn, Macpeak and Seas

[57] ABSTRACT

The winder comprises a mandrel 4 rotatively mounted in a support 1 and around which the strap of the safety belt is wound. The mandrel is biased by a torsion spring in the winding direction and a locking device, adapted to lock the mandrel 4 against rotation and prevent the unwinding of the strap, is provided. The locking device comprises a first element 9 rigid with the support 1 and adapted to cooperate, under the control of an acceleration detector, with a second element 7 which is driven by the mandrel 4 for locking the mandrel against rotation. One of the first and second elements comprises projections for engagement in recesses provided in the other element 9. Abutment devices 10 are provided on one of the first and second elements for preventing, in normal use of the winder, the full engagement of the projections in the recesses. The abutment devices are destructible in the event of impact resulting in a sudden pull on the strap.

9 Claims, 16 Drawing Figures

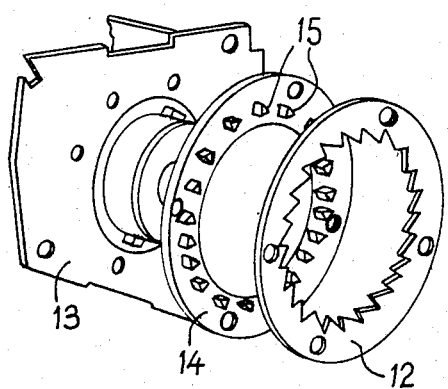
FIG. 6
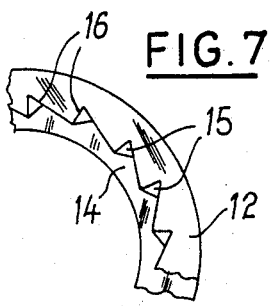
FIG. 7
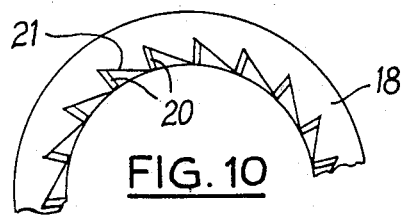
FIG. 10
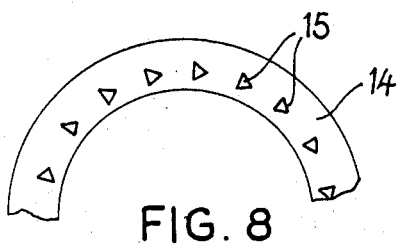
FIG. 8
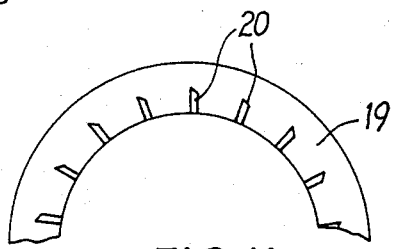
FIG. 11
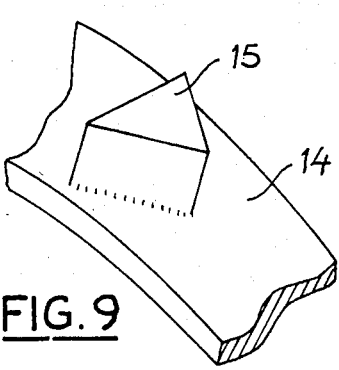
FIG. 9
FIG. 12
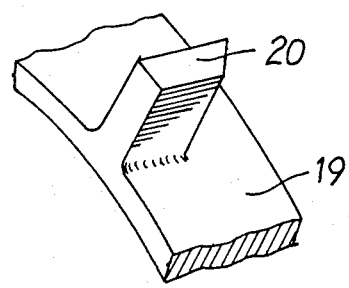

WINDER FOR A SAFETY BELT HAVING A RAPID LOCKING AND UNLOCKING ACTION AND A REDUCED OPERATING NOISE

DESCRIPTION

The present invention relates to winders for safety belts intended in particular for ground, sea, air or space motor vehicles or craft.

Automatically-locked winders for safety belts are known which comprise a shaft on which the safety belt is wound and which is biased by a torsion spring in the winding direction and a locking device which, in the event of impact, locks the shaft against rotation and prevents the unwinding of the belt.

The locking device usually comprises means rigid with the support of the winder and adapted to cooperate, under the control of an acceleration detector, with means driven by the belt winding shaft so as to lock the latter against rotation.

The means of the locking device respectively comprise projections and recesses, the locking occurring when the projections reach the bottom of said recesses.

Under normal conditions of utilization of the belt, for example when a passenger leans forward toward the glove box of the vehicle, the locking of the belt occurs for any sudden movement of the user and, owing to the engagement of the projections of one of the means to the bottom of the recesses of the other means of the locking device, the release of the belt requires a straightening of the chest of the user of a considerable extent.

The user is consequently interrupted in his movement for a period which constitutes a hindrance.

An object of the invention is to overcome the drawback of known winders by providing a winder whose locking and unlocking time under normal conditions of utilization are considerably reduced without however adversely affecting the effectiveness of the locking in the event of impact.

The invention therefore provides an automatically locked winder for a safety belt comprising a mandrel rotatively mounted on a support and on which the safety belt is wound, said mandrel being biased by a torsion spring in the winding direction, and a locking device for, upon a sudden traction exerted on the belt, locking the mandrel against rotation and preventing the unwinding of the belt, said locking device comprising first means rigid with the support of the winder and cooperative, under the control of an acceleration detector, with second means driven by the mandrel so as to lock said mandrel against rotation, one of said first and second means comprising projections for engaging in recesses provided in the other means, wherein there are provided on one of said first and second means abutment means for preventing, in normal use of the winder, the full engagement of said projections in said recesses, said abutment means being destructible in the event of impact.

Further features of the invention will be apparent from the ensuing description with reference to the accompanying drawings which are given solely by way of example and in which:

FIG. 6 is a partial exploded perspective view of another embodiment of the destructible abutment means according to the invention associated with the locking device of a winder;

FIG. 7 is a partial front elevational view of the ratchet wheel of the locking device of FIG. 5 with the destructible abutment means engaged in each of the teeth of the wheel;

FIG. 8 is a partial front elevational view of the ring carrying the destructible abutments engaged in the teeth of the ratchet wheel of FIG. 7;

FIG. 9 is a partial perspective view of the shape of a destructible abutment for cooperation with one of the teeth of the ratchet wheel of FIG. 7;

FIGS. 10, 11 and 12 are views corresponding to those of FIGS. 7, 8 and 9 respectively, of another embodiment of the destructible abutment means associated with the ratchet wheel of the locking device of a winder;

Figure 1:
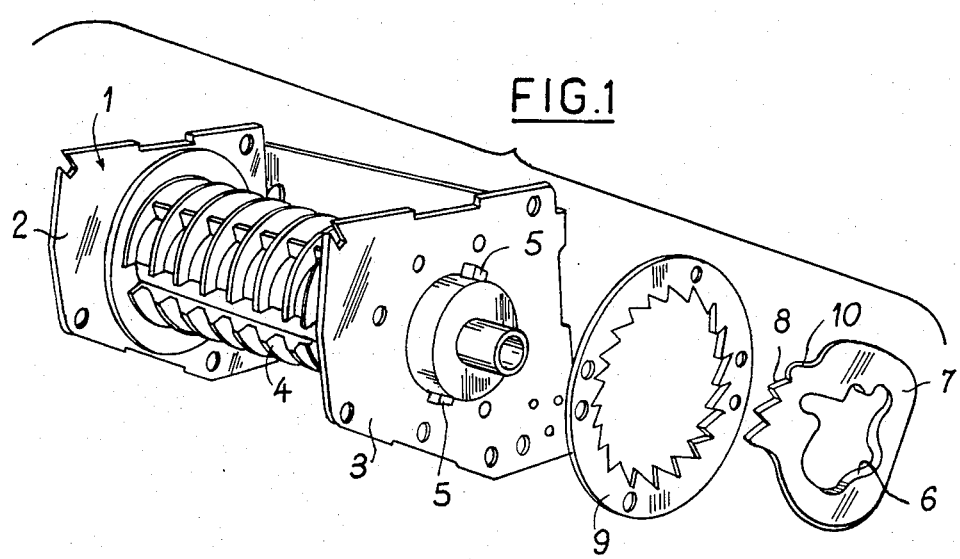
FIG. 1 is a partial exploded perspective view of a safety belt winder provided with destructible abutment means according to the invention.

The winder partly shown in FIG. 1 comprises a U-shaped metal support 1 in the branches 2 and 3 of which is rotatively mounted a mandrel 4 on which the strap of the winder (not shown) is adapted to be wound. The end of the mandrel 4 which projects beyond the branch 3 of the support 1 has projections 5 which are diametrically opposed and are adapted to cooperate with a closed cam contour 6 formed in an element 7 constituting a cam and provided with outer teeth 8. The cam 7 arranged in this way is adapted to engage with the ratchet wheel 9 surrounding the end portion of the mandrel 4 which projects from the branch 3 of the support 1 and fixed on this branch so as to be coaxial with said mandrel. The cam 7 and the ratchet wheel 9 in fact constitute the locking device of the winder which, under the action of an acceleration detector (not shown), lock the mandrel 4 against rotation by the engagement of the teeth 8 of the cam 7 with the internal teeth of the ratchet wheel 9.

The engagement of the two means constituting the locking device is achieved by the engagement of the outer teeth 8 of the cam 7 fully in the corresponding teeth of the inner teeth of the ratchet wheel 9. Consequently, when the winder is used under normal conditions, for example when a passenger provided with a safety belt leans forwardly with a relatively sudden movement, the full engagement of the complementary teeth of the locking device requires for the release of the belt a relatively large straigthening of the chest of the user.

This constitutes a considerable hindrance for the passenger who, in order to be able to continue his interrupted movement, must wait until the teeth 8 of the cam are disengaged from the inner teeth of the ratchet wheel 9.

In order to overcome this drawback, according to a first embodiment of the invention, there is associated with the outer teeth 8 of the cam 7 an additional shallow small tooth 10 which prevents, in normal use of the winder, the full engagement of the outer teeth 8 of the cam in the inner teeth 9 of the ratchet wheel and which, in the event of impacts, can be destroyed by the force exerted on the confronting teeth and which therefore does not constitute an obstacle to the full penetration of the outer teeth 8 of the cam in the inner teeth of the ratchet wheel.

Figure 2:
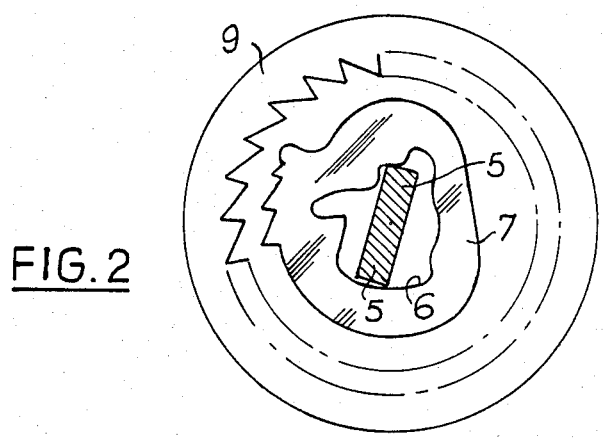
FIGS. 2, 3 and 4 are diagrammatic views of the means of the locking device of the winder of FIG. 1, in the position of rest, in normal use and in the event of impact respectively.

FIG. 2 shows the relative position of the diametrically opposed projections 5 of the mandrel 4, the cam 7 and the ratchet wheel 9 when the assembly is in the position of rest or inoperative position.

It will be observed that the invention is assumed to be applied to a winder whose mandrel is reinforced by a central metal bar of the type disclosed in the French patent application 81 20 230 filed on Oct. 28, 1981 by the Applicant, the projections 5 being formed by the ends of the bar.

However, the invention may also be applied to winders of different types.

Figure 3:
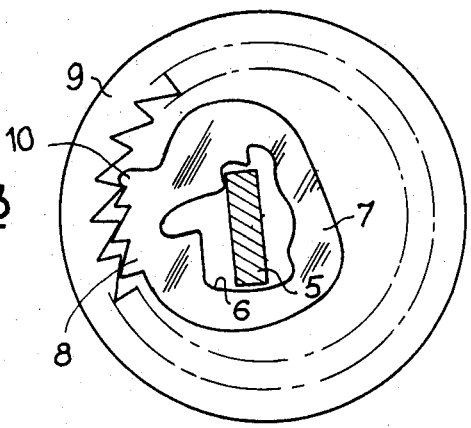

FIG. 3 shows the same component parts as those shown in FIG. 2, these parts occupying relative positions corresponding to a normal use of the winder. This FIG. 3 shows that, under the action of the projections 5 of the end of the mandrel 4, the cam 7 has been displaced toward the teeth of the ratchet wheel 9. The small tooth 10 of the outer teeth 8 prevents, by its engagement with one of the teeth of the inner teeth of the ratchet wheel, the full engagement of the outer teeth 8 in the corresponding teeth of the ratchet wheel. Therefore, while locking the mandrel against rotation and immobilizing the strap, the additional tooth 10, by the fact that it prevents the full engagement of the considered teeth which, owing to the small forces to be supported in the normal use of the winder would be unnecessary, imparts to the assembly an increased rate of reaction to the movements of the user. Indeed, as soon as the force exerted on the strap of the winder is eliminated, the additional tooth 10 is disengaged practically instantaneously from the corresponding tooth of the teeth of the ratchet wheel 9 and therefore releases the cam 7 relative to the ratchet wheel. On the other hand, when a sudden movement of the user causes the cam 7 to be driven by the shoulders 5 of the mandrel, the additional tooth 10 of the teeth 8 rapidly engages with the ratchet wheel 9 and immobilizes the cam 7.

Figure 4:
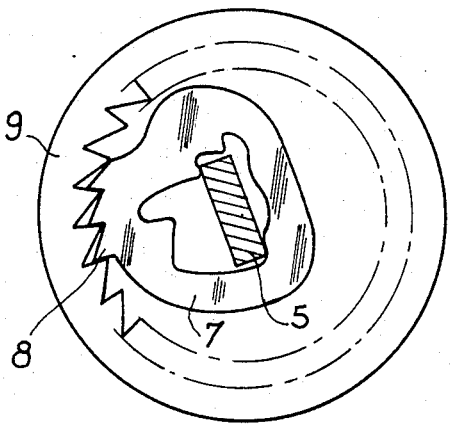

FIG. 4 shows the same parts as those of FIGS. 2 and 3 but in relative positions resulting from an impact transmitted to the winder by its strap.

This FIG. 4 shows that the intensity of the force exerted by the shoulders 5 of the mandrel on the cam 7 has caused the destruction of the additional tooth 10 which has been flattened by one of the teeth of the inner teeth of the ratchet wheel 9 so that the teeth of the outer teeth 8 of the cam 7 are fully engaged in the teeth of the ratchet wheel, which permits an effective locking of the mandrel 4 relative to the support 1 of the winder.

Figure 5:
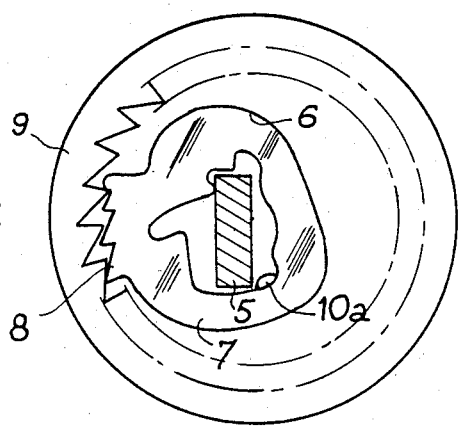
FIG. 5 is a diagrammatic view of a modification of the destructible abutment means carried by the cam of the locking device.

FIG. 5 shows the relative positions of the parts of a locking device for a winder similar to that of FIGS. 1 to 4 but in which the destructible abutment means, instead of being formed by an additional tooth of the outer teeth 8 of the cam 7, are formed by a small projection 10a on the cam contour 6 which is located in the path of one of the projections 5 of the mandrel and which, in normal operation, prevents, as shown in FIG. 5, the engagement of the teeth 8 of the cam fully in the inner teeth of the ratchet wheel 9.

In the event of impact, this projection 10a is destroyed by the projection 5, which permits the full engagement of the outer teeth 8 of the cam in the inner teeth of the ratchet wheel.

FIG. 6 partly shows a winder for a safety belt comprising a ratchet wheel 12 fixed to the support 13 of the mandrel, an interposed element 14 in the shape of a ring, for example made from plastics material, being interposed between the support 13 and the ratchet wheel 12. The interposed element 14 comprises on the side facing the ratchet wheel 12 as many axial projections 15 as the ratchet wheel has teeth. Each of said projections is adapted to be engaged against the steep edge of a corresponding tooth 16 of the ratchet wheel.

As shown in FIG. 7, each of the projections 15 of the ring 14 engaged against a steep edge of a tooth 16 of the ratchet wheel 12 constitutes a destructible abutment element for the outer teeth of a cam similar to the cam 7 of FIG. 1 adapted to cooperate with the ratchet wheel 12.

As can be seen in FIGS. 8 and 9, each of the axial projections 15 of the ring 14 of plastics material has a triangular section whose shape is adapted to the shape of the teeth 16 of the ratchet wheel. In engaging in the teeth 16 of the ratchet wheel, the projections 15 reduce the depth of these teeth so that, when the cam of the locking device is urged, under normal conditions of utilization, into engagement with the teeth of the ratchet wheel, its outer teeth are applied against the free edges of the projections 15 constituting abutments.

As under normal conditions of use the forces exerted by the cam on the teeth of the ratchet wheel are not large, the projections 15 constituting abutments are not crushed so that the locking and unlocking times of the locking device are reduced. Further, the operation is silent. On the other hand, when the winder is subjected to impact conditions, the outer teeth of the cam exert on the inner teeth of the ratchet wheel such forces that they crush the projections 15 constituting abutments and the teeth of the cam fully engage in the teeth of the ratchet wheel.

FIG. 10 shows partly a ratchet wheel 18 adapted to be fixed to a support of a winder mandrel for a strap similar to the support shown in FIG. 1. Associated with this ratchet wheel 18 is a ring 19 of plastics material carrying axial projections 20 of trapezoidal section engaged in the bottom of the teeth 21 of the ratchet wheel 18.

A better view of the shape of the abutment projections 20 is shown in FIGS. 11 and 12.

The function of the projections 20 is similar to the projections 15 of the ring 14 shown in FIG. 7.

As concerns the function of the teeth 20, it is the same as that of the teeth 15 described with reference to FIGS. 7 to 10.

Figure 13:
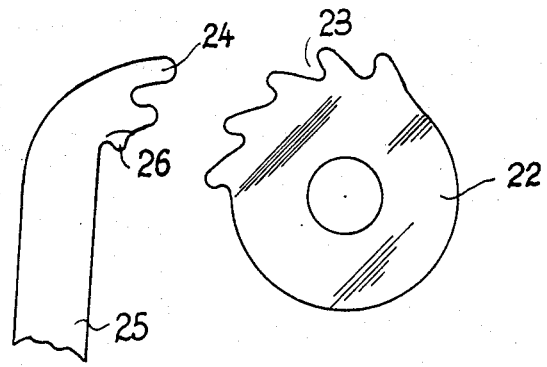
FIG. 13 is a diagrammatic view of another type of a locking device for a safety belt winder comprising destructible abutment means according to the invention.

The arrangement shown in FIG. 13 differs from the preceding devices in that the locking device of the winder here comprises a rotary element 22 adapted to be rendered rigid with the strap winding mandrel of the winder and including outer teeth 23 cooperative with the end teeth 24 of a lever 25 pivotally mounted on the fixed support of the winder.

According to the invention, the teeth 24 of the lever 25 further comprise a small additional tooth 26 which, when it engages with the outer teeth 23 under the normal conditions of use of the winder, prevents the full penetration of the teeth 24 of the lever 25 in the outer teeth 23 of the element 22.

On the other hand, in the event of impact, the forces exerted between the teeth are such that the additional tooth 26 is destroyed, which allows the full engagement between the teeth 24 and 23.

Figure 14:
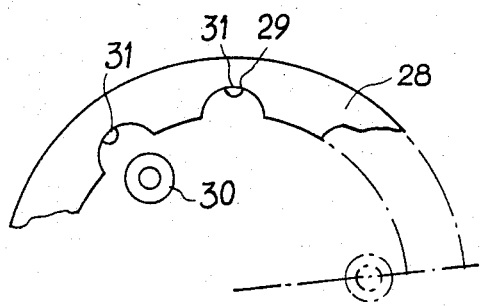
FIGS. 14, 15 and 16 are diagrammatic views of locking devices for a winder of another type provided with destructible abutment means according to the invention.

The arrangement diagrammatically shown in FIG. 14 applies to a winder which comprises, instead of a ratchet wheel of the type shown in FIGS. 1 and 5, a ring 28 provided with cavities 29 disposed at equal distances apart. The ring 28 is, like the ratchet wheel of the preceding embodiments, fixed to the support of the mandrel of the winder. Cooperative with the cavities 29 of the ring 28 are rollers 30 carried by a locking element which is capable of being connected to rotate with the mandrel by a suitable mechanism (not shown), the engagement of the rollers 30 in the cavities 29 locking the mandrel carrying the strap of the safety belt relative to the support of the winder.

In order to reduce the locking time of such an arrangement under normal conditions of use, each cavity 29 is provided with a crushable projection 31 which reduces the extent of penetration of the roller 30 in the cavity and which when crushed in the event of impact permits the full engagement of each roller in each corresponding cavity. The projections 31 are for example in one piece with the bottoms of the cavities 29.

Figure 15:
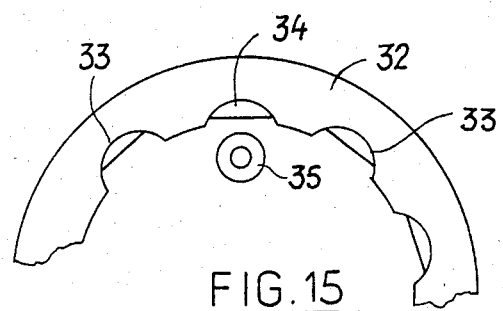

The arrangement shown in FIG. 15 comprises, like the arrangement of FIG. 13, a ring 32 having cavities 33 whose bottoms are provided with pads 34 of crushable material which perform the same function as the projections 31 of the embodiment of FIG. 14. The pads 34 may also carried by a ring interposed between the ring 32 and its support.

Figure 16:
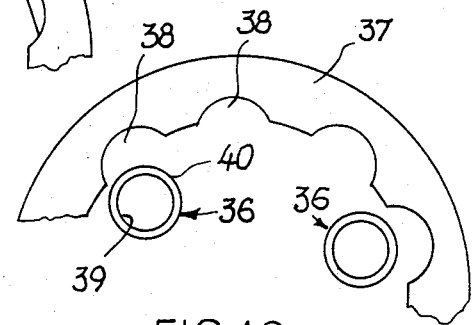

In the embodiment shown in FIG. 16, it is the rollers 36 of the locking device, which moreover comprises a ring 37 having cavities 38, which are constituted by a solid metal part 39 surrounded by a peripheral part 40 of crushable material, for example plastics material. Under normal conditions of use, the rollers 36, which have an increased diameter owing to their coating 40 of crushable material, only slightly penetrate the cavities 38, which results in an increased speed of reaction of the winder. On the other hand, in the event of impact, the peripheral material 40 of the rollers 36 is crushed and the rollers then enter the cavities until their solid part 39 comes into contact with the bottom of the cavities. Thus, in the event of impact, there is achieved a good locking of the mandrel, which is rigid with the elements carrying the rollers 36, with the support of the winder with which support the ring 37 defining the cavities is rigid.

It will be understood from the foregoing description that the invention is applicable to winders for safety belts of the most varied types. The destructible abutments, apart from the fact that they impart to the winders equipped therewith reduced response times both when locking and when unlocking under the normal conditions of use, render the operation of the winders much more silent since, in particular in their embodiments shown in FIGS. 6, 7, 10, 15 and 16, they employ, under the normal conditions of use, a contact between metal and a plastics material.

Having now described our invention what we claim as new and desire to secure by Letters Patent is:

1. An automatically-locked winder for a safety belt, the winder comprising a support, a mandrel rotatively mounted on the support and around which mandrel a strap of the safety belt is wound, a torsion spring associated with the mandrel for biasing the mandrel in a winding direction, a locking device cooperative with the mandrel for locking the mandrel against rotation and preventing the unwinding of the strap when a sudden pull is exerted on the strap, the locking device comprising first means rigid with the support, second means drivenly connected to the mandrel, the first means cooperating with the second means to lock the mandrel against rotation, one of said first means and second means comprising projections for engagement in recesses provided in the other means, abutment means being provided on only one of said first and second means which prevent, in normal use of the winder, the full engagement of said projections in said recesses, said abutment means being destructible in the event of impact resulting in a sudden pull on the strap, wherein said first means comprise a ratchet wheel having inner teeth and fixed to the support and said second means comprise a cam having an internal cam surface cooperating with a cam-driving element kinetically integral with said mandrel, said cam further having outer teeth for engaging the inner teeth of the ratchet wheel, said destructible abutment means comprising a small additional tooth associated to the outer teeth of the cam and adapted, in normal use of the winder, to prevent full engagement of the outer teeth of the cam in the inner teeth of the ratchet wheel, said additional tooth being destroyed in the event of impact by the force exerted between said inner teeth and outer teeth.

2. An automatically-locked winder for a safety belt, the winder comprising a support, a mandrel rotatively mounted on the support and around which mandrel a strap of the safety belt is wound, a torsion spring associated with the mandrel for biasing the mandrel in a winding direction, a locking device cooperative with the mandrel for locking the mandrel against rotation and preventing the unwinding of the strap when a sudden pull is exerted on the strap, the locking device comprising first means rigid with the support, second means drivenly connected to the mandrel, the first means cooperating with the second means to lock the mandrel against rotation, one of said first means and second means comprising projections for engagement in recesses provided in the other means, abutment means being provided on only one of said first and second means which prevent, in normal use of the winder, the full engagement of said projections in said recesses, said abutment means being destructible in the event of impact resulting in a sudden pull on the strap, wherein said first means comprise a ratchet wheel having inner teeth and fixed to the support and the second means comprise a cam having an internal cam surface cooperating with a cam-driving element kinetically connected to said mandrel, said cam further having outer teeth for engaging the inner teeth of the ratchet wheel, and said destructible abutment means comprise elements of crushable material for reducing the depth of the inner teeth of the ratchet wheel and mounted in the inner teeth of the ratchet wheel.

3. An automatically-locked winder for a safety belt, the winder comprising a support, a mandrel rotatively mounted on the support and around which mandrel a strap of the safety belt is wound, a torsion spring associated with the mandrel for biasing the mandrel in a winding direction, a locking device cooperative with the mandrel for locking the mandrel against rotation and preventing the unwinding of the strap when a sudden pull is exerted on the strap, the locking device comprising first means rigid with the support, second means drivenly connected to the mandrel, the first means cooperating with the second means to lock the mandrel against rotation, one of said first means and second means comprising projections for engagement in recesses provided in the other means, abutment means being provided on only one of said first and second means which prevent, in normal use of the winder, the full engagement of said projections in said recesses, said abutment means being destructible in the event of impact resulting in a sudden pull on the strap, wherein said first means comprise a ratchet wheel having inner teeth and fixed to the support and the second means comprise a cam having an internal cam surface cooperating with a cam-driving element kinetically connected to said mandrel, said cam further having outer teeth for engaging the inner teeth of the ratchet wheel, said destructible abutment means comprising elements of crushable material for reducing the depth of the inner teeth of the ratchet wheel and mounted in the inner teeth of the ratchet wheel, said elements of crushable material being constituted by axial projections integral with a ring of plastic material integrally connected to said mandrel and said ratchet wheel and interposed between the ratchet wheel and the support.

4. An automatically-locked winder for a safety belt, the winder comprising a support, a mandrel rotatively mounted on the support and around which mandrel a strap of the safety belt is wound, a torsion spring associated with the mandrel for biasing the mandrel in a winding direction, a locking device cooperative with the mandrel for locking the mandrel against rotation and preventing the unwinding of the strap when a sudden pull is exerted on the strap, the locking device comprising first means rigid with the support, second means drivenly connected to the mandrel, the first means cooperating with the second means to lock the mandrel against rotation, one of said first means and second means comprising projections for engagement in recesses provided in the other means, abutment means being provided on only one of said first and second means which prevent, in normal use of the winder, the full engagement of said projections in said recesses, said abutment means being destructible in the event of impact resulting in a sudden pull on the strap, wherein said first means comprise a ratchet wheel having inner teeth and fixed to the support and the second means comprise a cam having an internal cam surface cooperating with a cam-driving element kinetically connected to said mandrel, said cam further having outer teeth for engaging the inner teeth of the ratchet wheel, said destructible abutment means comprising elements of crushable material for reducing the depth of the inner teeth of the ratchet wheel and mounted in the inner teeth of the ratchet wheel, said elements of crushable material being constituted by axial projections integral with a ring of plastic material integrally connected to said mandrel and said ratchet wheel and interposed between the ratchet wheel and the support, said projections having a triangular section and being applied onto the bottom between any two adjacent inner teeth of the ratchet wheel.

5. An automatically-locked winder for a safety belt, the winder comprising a support, a mandrel rotatively mounted on the support and around which mandrel a strap of the safety belt is wound, a torsion spring associated with the mandrel for biasing the mandrel in a winding direction, a locking device cooperative with the mandrel for locking the mandrel against rotation and preventing the unwinding of the strap when a sudden pull is exerted on the strap, the locking device comprising first means rigid with the support, second means drivenly connected to the mandrel, the first means cooperating with the second means to lock the mandrel against rotation, one of said first means and second means comprising projections for engagement in recesses provided in the other means, abutment means being provided on only one of said first and second means which prevent, in normal use of the winder, the full engagement of said projections in said recesses, said abutment means being destructible in the event of impact resulting in a sudden pull on the strap, wherein said first means comprise a ratchet wheel having inner teeth and fixed to the support and the second means comprise a cam having an internal cam surface cooperating with a cam-driving element kinetically connected to said mandrel, said cam further having outer teeth for engaging the inner teeth of the ratchet wheel, said destructible abutment means comprising element of crushable material for reducing the depth of the inner teeth of the ratchet wheel and mounted in the inner teeth of the ratchet wheel, said elements of crushable material being constituted by axial projections integral with a ring of plastic material integrally connected to said mandrel and said ratchet wheel and interposed between the ratchet wheel and the support, said projections having a trapezoidal section and being in applied relation to an edge of each tooth of the inner teeth of the ratchet wheel.

6. An automatically-locked winder for a safety belt, the winder comprising a support, a mandrel rotatively mounted on the support and around which mandrel a strap of the safety belt is wound, a torsion spring associated with the mandrel for biasing the mandrel in a winding direction, a locking device cooperative with the mandrel for locking the mandrel against rotation and preventing the unwinding of the strap when a sudden pull is exerted on the strap, the locking device comprising first means rigid with the support, second means drivenly connected to the mandrel, the first means cooperating with the second means to lock the mandrel against rotation, one of said first means and second means comprising projections for engagement in recesses provided in the other means, abutment means being provided on only one of said first and second means which prevent, in normal use of the winder, the full engagement of said projections in said recesses, said abutment means being destructible in the event of impact resulting in a sudden pull on the strap, wherein said first means of the locking device comprise a ring defining cavities and said second means comprise rollers adapted to engage said cavities, said destructible abutment means comprising crushable elements interposed between the rollers and the bottom of the cavities.

7. An automatically-locked winder for a safety belt, the winder comprising a support, a mandrel rotatively mounted on the support and around which mandrel a strap of the safety belt is wound, a torsion spring associated with the mandrel for biasing the mandrel in a winding direction, a locking device cooperative with the mandrel for locking the mandrel against rotation and preventing the unwinding of the strap when a sudden pull is exerted on the strap, the locking device comprising first means rigid with the support, second means drivenly connected to the mandrel, the first means cooperating with the second means to lock the mandrel against rotation, one of said first means and second means comprising projections for engagement in recesses provided in the other means, abutment means being provided on only one of said first and second means which prevent, in normal use of the winder, the full engagement of said projections in said recesses, said abutment means being destructible in the event of impact resulting in a sudden pull on the strap, wherein said first means of the locking device comprise a ring defining cavities and said second means comprise rollers adapted to engage said cavities, and said destructible abutment means comprising crushable projections provided in the bottom of each cavity and integral with the ring.

8. An automatically-locked winder for a safety belt, the winder comprising a support, a mandrel rotatively mounted on the support and around which mandrel a strap of the safety belt is wound, a torsion spring associated with the mandrel for biasing the mandrel in a winding direction, a locking device cooperative with the mandrel for locking the mandrel against rotation and preventing the unwinding of the strap when a sudden pull is exerted on the strap, the locking device comprising first means rigid with the support, second means drivenly connected to the mandrel, the first means cooperating with the second means to lock the mandrel against rotation, one of said first means and second means comprising projections for engagement in recesses provided in the other means, abutment means being provided on only one of said first and second means which prevent, in normal use of the winder, the full engagement of said projections in said recesses, said abutment means being destructible in the event of impact resulting in a sudden pull on the strap, wherein said first means of the locking device comprise a ring defining cavities and said second means comprise rollers adapted to engage said cavities, and said destructible abutment means comprise crushable elements interposed between the rollers and the bottom of the cavities and constituted by crushable pads of plastic material provided in the bottom of each cavity.

9. An automatically-locked winder for a safety belt, the winder comprising a support, a mandrel rotatively mounted on the support and around which mandrel a strap of the safety belt is wound, a torsion spring associated with the mandrel for biasing the mandrel in a winding direction, a locking device cooperative with the mandrel for locking the mandrel against rotation and preventing the unwinding of the strap when a sudden pull is exerted on the strap, the locking device comprising first means rigid with the support, second means drivenly connected to the mandrel, the first means cooperating with the second means to lock the mandrel against rotation, one of said first means and second means comprising projections for engagement in recesses provided in the other means, abutment means being provided on only one of said first and second means which prevent, in normal use of the winder, the full engagement of said projections in said recesses, said abutment means being destructible in the event of impact resulting in a sudden pull on the strap, wherein said first means of the locking device comprise a ring defining cavities and said second means comprise rollers adapted to engage said cavities, and said destructible abutments means comprise crushable elements interposed between the rollers and the bottom of the cavities and constituted by crushable coatings of plastic material on the rollers.

* * * * *